United States Patent [19]
Bergersen et al.

[11] Patent Number: 4,501,956
[45] Date of Patent: Feb. 26, 1985

[54] ELECTRICAL RESISTANCE HEATING ELEMENT

[75] Inventors: Hans A. Bergersen, Oslo; Eilif Risberg, Osteras, both of Norway

[73] Assignee: International Standard Electric Corporation, New York, N.Y.

[21] Appl. No.: 303,439

[22] Filed: Sep. 18, 1981

[51] Int. Cl.³ ............................................. H05B 3/10
[52] U.S. Cl. .................................. 219/553; 219/517; 219/543; 219/253; 337/144; 337/161; 337/401; 337/405; 338/212; 29/840; 29/620; 361/104
[58] Field of Search ............... 219/210, 253, 517, 522, 219/528, 543, 553; 361/104, 400; 337/142, 144, 160, 161, 162, 164, 166, 337, 395, 401, 405, 403, 397; 29/620, 840, 625; 338/212, 314; 174/68.5

[56] References Cited

U.S. PATENT DOCUMENTS

| | | | |
|---|---|---|---|
| 2,464,633 | 3/1949 | Bohener | 219/517 |
| 2,845,519 | 7/1958 | Willat | 219/517 X |
| 3,263,307 | 8/1966 | Lund et al. | 338/212 X |
| 3,336,557 | 8/1967 | Lund et al. | 338/210 |
| 3,417,229 | 12/1968 | Shomphe et al. | 219/528 |
| 3,423,574 | 1/1969 | Shomphe et al. | 219/528 |
| 3,528,048 | 9/1970 | Kirk | 337/401 |
| 3,603,909 | 9/1971 | Salzer | 337/161 |
| 4,006,443 | 2/1977 | Kouchich et al. | 219/517 X |
| 4,025,893 | 5/1977 | Bergersen | 338/212 |
| 4,092,626 | 5/1978 | Bergersen | 338/212 |
| 4,101,820 | 7/1978 | Montanari | 337/297 X |
| 4,213,031 | 7/1980 | Farber | 219/469 X |
| 4,379,318 | 5/1983 | Ootsuka | 337/297 X |

FOREIGN PATENT DOCUMENTS 867090  5/1961  United Kingdom ............... 337/297

Primary Examiner—Volodymyr Y. Mayewsky
Attorney, Agent, or Firm—John T. O'Halloran; Peter R. Ruzek; Mary C. Werner

[57] ABSTRACT

Electrical resistance heating element including a number of metal strips arranged in a meander-like pattern. In the resistance metal strips, which are made from a non-expensive base sheet material like lead, there is incorporated at least one fuse which will operate if the heat transfer from a randomly placed area of critical size (a critical area) is substantially blocked. The fuse or fuses are preferably constituted by a lead/tin alloy rolled into intimate contact with the lead base material.

12 Claims, 11 Drawing Figures

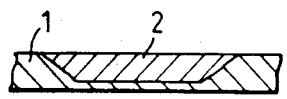  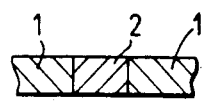
FIG.1  FIG.2  FIG.3
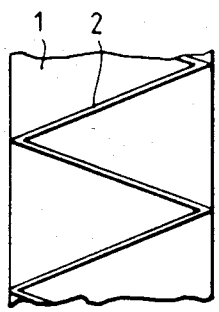 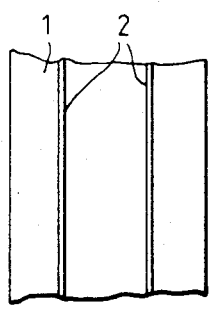 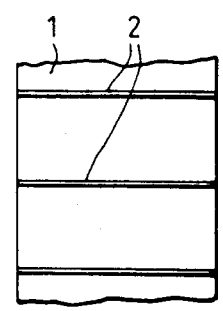
FIG.4  FIG.5  FIG.6
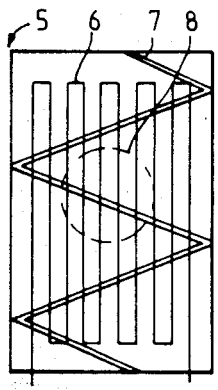 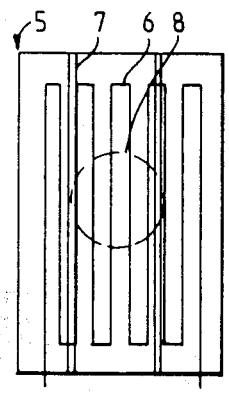 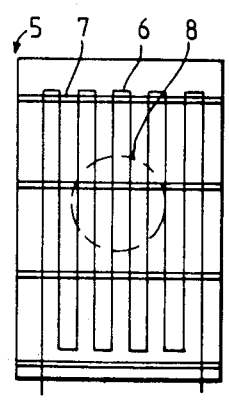
FIG.7  FIG.8  FIG.9
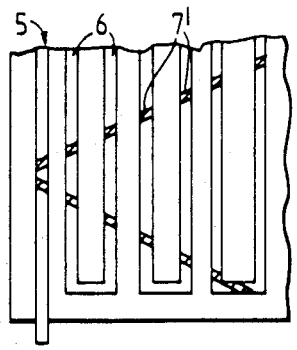 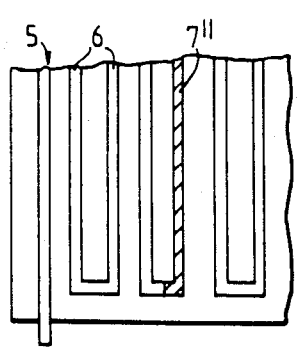
FIG.10  FIG.11

ELECTRICAL RESISTANCE HEATING ELEMENT

BACKGROUND OF THE INVENTION

The present invention relates to electrical resistance heating elements and in particular to elements having a flat configuration and consisting of a number of metal strips arranged in a meander like pattern embedded in or laminated within an insulation body.

Such heating elements are well known for U.S. Pat. Nos. 3,263,307 and 3,336,557 (both to O. G. Lund et al.) as well as from U.S. Pat. Nos. 4,025,893 and 4,092,626 (both to H. A. Bergersen), a main feature of these inventions being that the resistance metal strips are made of a material having a melting point lower than 200° C. When such elements are used as electrical heating of apartments and houses and the installation necessitates close contact with combustible material such as wood and wallpaper, it is essential that the temperature rise of the heating element surroundings at no place exceeds 150° C. This requirement can be achieved by using as a resistance strip a metal alloy consisting of 61.5% tin, 37.7% lead and 0.8% antimony, which has a melting point at 183° C.

A heating element, where low melting resistance strips are welded between two layers of insulating material, acts as one large thermal fuse if it is operated under abnormal conditions, for example, when it is unduly covered by heat insulating materials. When the temperature in such cases approaches the melting point of the alloy (170° C.+), the mechanical properties of the foil strips become very poor, and in this state, the foil may fracture at any time before the melting point is reached. At the moment the strip fracture starts, the cross-section of the strip is reduced, and it melts instantly, causing the current path to be broken. The heating element must thereafter be replaced with a new one.

There are, however, also known resistance heating elements having only one fuse. Such elements are for instance described in U.S. Pat. No 3,417,229 (G. J. Shomphe et al.), in which there is inserted a thermal fuse for each individual heater unit. Such units will only be guarded against overheating if the fuse itself is overheated. Such overheating will occur either if the fuse itself is excessively thermally insulated or if the heater unit draws excessive current. The fuse will melt at a desired temperature when overheated and cut the current so that the heater unit itself probably need not be replaced. If, however, a heater unit area somewhat displaced from the fuse is overheated, the wallpaper and surroundings may catch fire before the fuse cuts the current path.

The safest type of resistance heating elements is therefore considered to be that previously described. Experiments have shown, however, that it is not necessary for each and every square centimeter of the resistance element to be capable of fusing at the desired low temperature.

SUMMARY OF THE INVENTION

The main object of the present invention is the provision of a new and improved heating element which maintains the excellent heating and installation properties of existing elements.

A feature of the invention is the provision of an electrical resistance heating element in which at least one fuse portion is incorporated in a resistance metal strip.

By using a heating element in accordance with the present invention thermal overheating will cause breakdown of the current path at defined places, improving the safety and reducing the risk of overheating.

The thermal fuses must be distributed in such a way that if the resistance element, in addition to the usual installation covering, is partly covered by various items, such as boarding, furniture, carpets, etc., the surface temperature on the covered area must at no place exceed a critical value. The degree of unauthorized covering may vary with type and size of material or article, and the worst case will occur if heat transfer from a certain area is effectively blocked. By experiments it will be possible to determine the maximum size of a randomly placed area of the heating element which may be effectively thermally insulated without causing rise of the surface temperature to the critical value at any place within the covered area. This area is called the critical area. The thermal fuses will therefore have to be distributed in such a way that at least one such fuse will operate if an area larger than the critical area is covered sufficiently to block the heat transfer.

In many instances, thermal insulation of a certain area of a heating element is not effective. In experiments done in order to define the critical area, a 100 mm thick mineral wool mat was used as excess covering on the outside of the regular surface material.

In order to simulate a heating element ceiling installation, the following arrangement was used. A heating element, 500×1200 mm in size, constructed from meander formed lead antimony strips laminated between plastic sheets, was installed between a 200 mm thick mineral wool mat in horizontal position and a 12 mm thick chip board, the board facing downward. At stabilized conditions, the heating element was operating at 210 W/m$^2$ with a maximum temperature on the chip board of 78° C.

In order to simulate harmful covering of the ceiling, pieces of 100 mm thick mineral wool mats were placed against the lower side of the chip board. The critical temperature was chosen to be 175° C., and the critical area turned out to be in the order of 400 cm$^2$. The size of the critical area will decrease with decreased chip board thickness. It will also decrease if the chip board is exchanged with materials having lower sideways heat conduction. The preferred shape for the critical area is a circle, but a square will give a close approximation.

The well-known process of making heating elements of the described type is to start from a block of a desired alloy and roll this block into a metal sheet of 5–25μ thickness. The sheet is thereafter cut to produce a desired resistance strip web, e.g. a meander pattern, while laminating the resistance strip with insulation material on one or both sides.

When making a suitable resistance element of the present invention, it is essential that the main metal component is inexpensive, and lead is still considered to be the most suitable material. However, in order to make the lead sheet less brittle, it should be alloyed with about 1% antimony.

The distributed discrete thermal fuses are obtained by locally introducing a layer of metal that alloys to lead giving a composition having a melting point lower than 200° C. A suitable material is a metal selected from the group consisting of tin, lead/tin/antimony alloy and lead/bismuth alloy.

BRIEF DESCRIPTION OF THE DRAWING

The above mentioned and other objects and features of the present invention will become more apparent by reference to the following description taken in conjunction with the accompanying drawings, in which:

FIGS. 1-3 illustrates various ways of thermal fuse arrangements.

FIGS. 4-6 schematically show various ways of placing fuse material on a base material sheet, FIGS. 7-9 illustrate alternative fuse material arrangements on a heating element, and FIGS. 10-11 show examples of discrete thermal fuses on the resistance strips.

DESCRIPTION OF THE PREFERRED EMBODIMENT

There are, as illustrated in FIGS. 1-3, several ways of introducing thermal fuses in the resistance strip. In FIG. 1 the base material 1 is provided with an insert 2 of fuse material. In FIG. 2 the fuse material 2 is embedded between two base material layers 1. In FIG. 3 the base material sheet or strip is broken by a full cross-section of fuse material 2. While a cross-section as illustrated in FIGS. 1 and 2 can be obtained by a rolling process, the FIG. 3 version will also include a soldering process before rolling. FIGS. 4-6 schematically illustrate various ways of arranging fuse material strips 2 on an uncut base material sheet. 1.

When the materials 1 and 2 illustrated in FIGS. 1 to 6 are lead and tin respectively (preferably the fuse material 2 should be a lead/tin alloy), it is assumed that the heat resulting from normal operation of the heating element will cause the materials in the contacting area to alloy so that the small portion of the alloyed material will have a desired melting point of about 180° C. It may, however, be more desirable to ensure during the manufacturing process and before placing the heating element into normal operation that the base/fuse contact area is alloyed to have the desired melting point.

When a heating element is manufactured according to the above or other methods, an element is obtained wherein any one of the ditributed discrete thermal fuses will alloy in a ratio of approximately 60% tin and 40% lead, melt and break the current path if a randomly placed area of a certain size (critical area) of the heating element including the thermal fuse is covered in an unauthorized manner.

While the material of the resistance metal strips has been indicated as lead and tin as well as lead and bismuth, other materials may be used, for example, steel as base material and silver/copper as fuse material, or chromium/nickel as base material and brass as fuse material, etc.

FIGS. 7 to 9 illustrate a heating element 5 showing three alternative ways of arranging fuse material strips 7 on an insulation body 9. The electrical resistance strips 6 are for convenience indicated to form a meander pattern, but it should be obvious that the resistance strip or strips can be arranged in any convenient manner. While the original cause of the fuse material strips are shown as full drawn lines, it will be understood that the fuse strips will not form a current path along these lines. This statement is at least true for the illustrations of FIGS. 7 and 9, where the final product will look somewhat like the partial view of the heating element shown in FIG. 10. In FIG. 8, however, where the fuse strips are placed so as to be parallel with the longitudinal parts of the meander resistance strip pattern, the fuse strip will carry current along a substantial part of its length.

A discrete thermal fuse is obtained at all crossings or overlappings between a fuse strip 7 and a resistance strip 6 in FIGS. 7, 8 and 9. In accordance with the present invention the discrete thermal fuses should be distributed so that at least one fuse will be covered wholly or partly by a critical area 8, which is randomly placed on the heating element 5. As described, the relevant fuse will operate, i.e. melt, when it is covered so that as its temperature reaches the critical value, a break will occur in the current path.

FIGS. 10 and 11 schematically illustrate an expanded view of a part of the heating element 5 of FIGS. 7 and 8 including resistance strips 6 which are provided with a number of discrete thermal fuses 7' and 7'' respectively.

The fuse material strips should preferably be placed on the resistance material base foil at some stage prior to cutting of the base foil into the desired pattern of resistance strips (FIGS. 4-6). In this way it is ensured that the fuse material strips are also cut to provide the desired number of discrete thermal fuses on the resistance strips.

Another possible method is to arrange the discrete fuses on the resistance strips after the base sheet has been cut into the desired pattern, but such a method will be rather complicated, and difficulty will also be experienced in obtaining the proper contact between the two materials.

In all embodiments of the present invention proper contact or alloyed connection between the two materials will be facilitated if the material surfaces are clean and free from corrosion and oxide films before the contacting operation.

While we have described above the principles of our invention in connection with specific apparatus, it is to be clearly understood that this description is made only by way of example and not as a limitation to the scope of our invention as set forth in the objects thereof and in the accompanying claims.

We claim:

1. An electrical heating element comprising:
   a sheet of an electrical resistance metal having a predetermined melting temperature; and
   a strip of a metallic fuse material having a melting temperature below said predetermined melting temperature arranged in a predetermined pattern incorporated in said resistance metal sheet, said fuse material and said resistance metal strip constituting a conductive path of a uniform cross-section throughout.

2. The heating element as claimed in claim 1 wherein said fuse material is located on said resistance metal such that if heat transfer from a critical area of the element is blocked at least a part of said fuse material will melt.

3. The heating element as claimed in claim 1 wherein said fuse material is located on said resistance metal such that if any location on the element exceeds a critical temperature at least a portion of said fuse material will melt.

4. The heating element as claimed in claim 3 wherein said critical temperature is approximately 180° C.

5. The heating element as claimed in claim 1 wherein said fuse material comprises strip portions extending through the entire cross sectional area of the sections of the resistance metal sheet.

6. The heating element as claimed in claim 5 wherein said fuse strip portions are eaminated into said metal sheet.

7. The heating element as claimed in claim 1 wherein said resistance metal is lead.

8. The heating element as claimed in claim 7 wherein said fuse materials is a metal that alloys with lead and has a melting point lower than 200° C.

9. The heating element as claimed in claim 8 wherein said metal is selected from the group consisting of tin, an alloy of lead, tin and antimony and an alloy of lead and bismuth.

10. A method for making an electrical heating element comprising:

forming a sheet of electrical resistance metal having a predetermined melting temperature;

juxtaposing a strip of a metallic fuse material having a melting temperature below said predetermined temperature in a predetermined pattern with the resistance material;

pressing the fuse material and the resistance metal together to form a layer of uniform thickness; and cutting the pressed layer in a meander pattern to form a conductive path of a uniform cross section.

11. The method as claimed in claim 10 further comprising:

laminating the cut pressed layer with an insulating material.

12. The method as claimed in claim 10 wherein the pressing step includes a rolling process.

* * * * *